United States Patent
Kawaba (10) Patent No.: US 10,324,854 B2
(45) Date of Patent: Jun. 18, 2019

(54) INFORMATION PROCESSING APPARATUS AND CONTROL METHOD FOR DYNAMIC CACHE MANAGEMENT

(71) Applicant: FUJITSU LIMITED, Kawasaki-shi, Kanagawa (JP)

(72) Inventor: Motoyuki Kawaba, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 111 days.

(21) Appl. No.: 15/052,942

(22) Filed: Feb. 25, 2016

(65) Prior Publication Data

US 2016/0283393 A1    Sep. 29, 2016

(30) Foreign Application Priority Data

Mar. 23, 2015    (JP) ................. 2015-059835

(51) Int. Cl.
  *G06F 12/00* (2006.01)
  *G06F 12/0893* (2016.01)
  *G06F 12/0888* (2016.01)

(52) U.S. Cl.
  CPC ...... *G06F 12/0893* (2013.01); *G06F 12/0888* (2013.01); *G06F 2212/1016* (2013.01); *G06F 2212/3042* (2013.01); *G06F 2212/601* (2013.01); *G06F 2212/604* (2013.01)

(58) Field of Classification Search
  CPC .. G06F 3/0689; G06F 3/0685; G06F 12/0893; G06F 2212/601; G06F 2212/1016; G06F 2212/3042
  See application file for complete search history.

(56) References Cited

U.S. PATENT DOCUMENTS

| | | | |
|---|---|---|---|
| 2006/0161755 A1* | 7/2006 | Uchikawa | G06F 9/5016 711/170 |
| 2006/0184758 A1 | 8/2006 | Satori et al. | |
| 2010/0115191 A1 | 5/2010 | Hampel et al. | |
| 2010/0274950 A1 | 10/2010 | Yano et al. | |
| 2011/0099349 A1 | 4/2011 | Yano et al. | |
| 2014/0101370 A1 | 4/2014 | Chu et al. | |
| 2015/0378855 A1* | 12/2015 | Zimoto | G06F 11/008 714/6.23 |
| 2016/0253263 A1* | 9/2016 | Takada | G06F 12/0871 711/119 |

FOREIGN PATENT DOCUMENTS

| | | |
|---|---|---|
| JP | 2006-195569 | 7/2006 |
| JP | 2009-211227 | 9/2009 |
| JP | 2010-524059 | 7/2010 |
| JP | 2014-078231 | 5/2014 |

* cited by examiner

*Primary Examiner* — Arvind Talukdar
(74) *Attorney, Agent, or Firm* — Fujitsu Patent Center

(57) ABSTRACT

An information processing apparatus includes a storage device configured to have a first storage area disposed on a first memory, a second storage area disposed on a second memory being slower in speed than the first memory to be cached by using a capacity of a cache area exclusive of the first storage area on the first memory, and a third storage area disposed on the second memory without being cached, and a processor configured to increase a capacity of the third storage area while decreasing a capacity of the second storage area corresponding to the capacity of the cache area upon an increase of the capacity of the first storage area and a decrease of the capacity of the cache area.

10 Claims, 12 Drawing Sheets

CACHE AREA MANAGEMENT TABLE ~6

| START ADDRESS | SIZE |
|---|---|
| 0x8000 | 0x2000 |

FIG.7B

DRAM AREA MANAGEMENT TABLE ~7

| START ADDRESS | SIZE |
|---|---|
| 0x2000 | 0x100 |
| 0x4000 | 0x300 |
| 0x7000 | 0x100 |

FIG.7C

SCM AREA MANAGEMENT TABLE 8

| TYPE | START ADDRESS | CUMULATIVE REFERENCE COUNT |
|---|---|---|
| 2 | 0x10000 | 10000 |
| 2 | 0x10100 | 10000 |
| 2 | 0x10200 | 10000 |
| 3 | 0x50000 | 0 |
| ... | ... | ... |
| 2 | 0x80000 | 20000 |

FIG.7D

| START ADDRESS | DATA | REFERENCE COUNT |
|---|---|---|
| 0x10000 | ... | 30 |
| 0x10100 | ... | 30 |
| 0x10200 | ... | 30 |
| 0x80000 | ... | 1000 |

FIG.8

INFORMATION PROCESSING APPARATUS AND CONTROL METHOD FOR DYNAMIC CACHE MANAGEMENT

CROSS-REFERENCE TO RELATED APPLICATION

This application is based upon and claims the benefit of priority of the prior Japanese Patent Application No. 2015-059835, filed on Mar. 23, 2015, the entire contents of which are incorporated herein by reference.

FIELD

The embodiments discussed herein are related to an information processing apparatus, storage device control method, and an information processing system.

BACKGROUND

An in-memory processing application defined as middleware on a server is a computer program to perform data processing without using an auxiliary storage device (also termed an external storage device) instanced by a hard disk and other equivalent storages by retaining data and a program on a memory. A memory usage quantity increases with a rise of a data quantity treated by the in-memory processing application. A layout of disposing a memory pool outside the server is considered for coping with the increase in memory usage quantity. The memory pool is hardware having a memory interface and containing a plurality of memories.

A Storage Class Memory (SCM) becomes utilized in addition of a high-speed memory instanced by a DRAM (Dynamic Random Access Memory) as the memory contained in the memory pool. The SCM is a memory that is lower in speed but larger in capacity than the DRAM. When using the SCM, it follows that the memory pool contains heterogeneous memories each having a different access speed.

It is considered for operating the in-memory processing application at a high speed to optimize allocation of data in the memory pool based on an access frequency and reusability of data. It may be sufficient to allocate, e.g., the data having the access frequency higher than a predetermined threshold value to the DRAM and the data having the access frequency equal to or lower than the predetermined threshold value to the SCM. An unused area of the DRAM can be also used as a cache of the SCM.

[Patent document 1] Japanese Laid-Open Patent Publication No. 2014-78231
[Patent document 2] Japanese National Publication of International Patent Application No. 2010-524059
[Patent document 3] Japanese Laid-Open Patent Publication No. 2006-195569
[Patent document 4] Japanese Laid-Open Patent Publication No. 2009-211227

SUMMARY

According to an aspect of the embodiments, an information processing apparatus includes a storage device configured to have a first storage area disposed on a first memory, a second storage area disposed on a second memory being slower in speed than the first memory to be cached by using a capacity of a cache area exclusive of the first storage area on the first memory, and a third storage area disposed on the second memory without being cached, and a processor configured to increase a capacity of the third storage area while decreasing a capacity of the second storage area corresponding to the capacity of the cache area upon an increase of the capacity of the first storage area and a decrease of the capacity of the cache area.

The object and advantages of the invention will be realized and attained by means of the elements and combinations particularly pointed out in the claims. It is to be understood that both the foregoing general description and the following detailed description are exemplary and explanatory and are not restrictive of the invention.

DESCRIPTION OF EMBODIMENTS

When the quantity of the data allocated to the DRAM increases in the memory pool, there decreases a capacity of the unused area, usable as the cache of the SCM, of the DRAM, i.e., a cache capacity. A balance between the data quantity to be cached from the SCM and the cache capacity on the DRAM collapses due to a decrease in cache capacity.

In this case, pages are frequently replaced in the cache on the DRAM, with a result that thrashing causing a decline of server performance is easy to occur.

An embodiment of the present invention will hereinafter be described based on the drawings. A configuration of the following embodiment is an exemplification, and the present invention is not limited to the configuration of the embodiment.

<Embodiment>

An in-memory processing application, when accessing a memory pool containing heterogeneous memories each having a different access speed in mixture, optimizes allocation of data to memory areas corresponding to a data access frequency. The in-memory processing application also improves the access speed by caching the data allocated to an SCM on a DRAM, the SCM having the access speed slower than the DRAM.

However, when a capacity of the cache area on the DRAM decreases, thrashing becomes easy to occur. The embodiment is therefore contrived to restrain the thrashing from occurring by reducing a capacity of the SCM area allocated with the data to be cached on the DRAM when a capacity of the cache area on the DRAM decreases.

The embodiment will be described by taking an example that the in-memory processing application accesses the memory pool containing the DRAM and the SCM in mixture. It is to be noted that the present invention is not limited to an area allocation method with respect to the memory pool containing the DRAM and the SCM in mixture. A method according to the present invention can be applied to accesses to a plurality of heterogeneous memories each having a different access speed.

<Hardware Configuration>

Figure 1A:
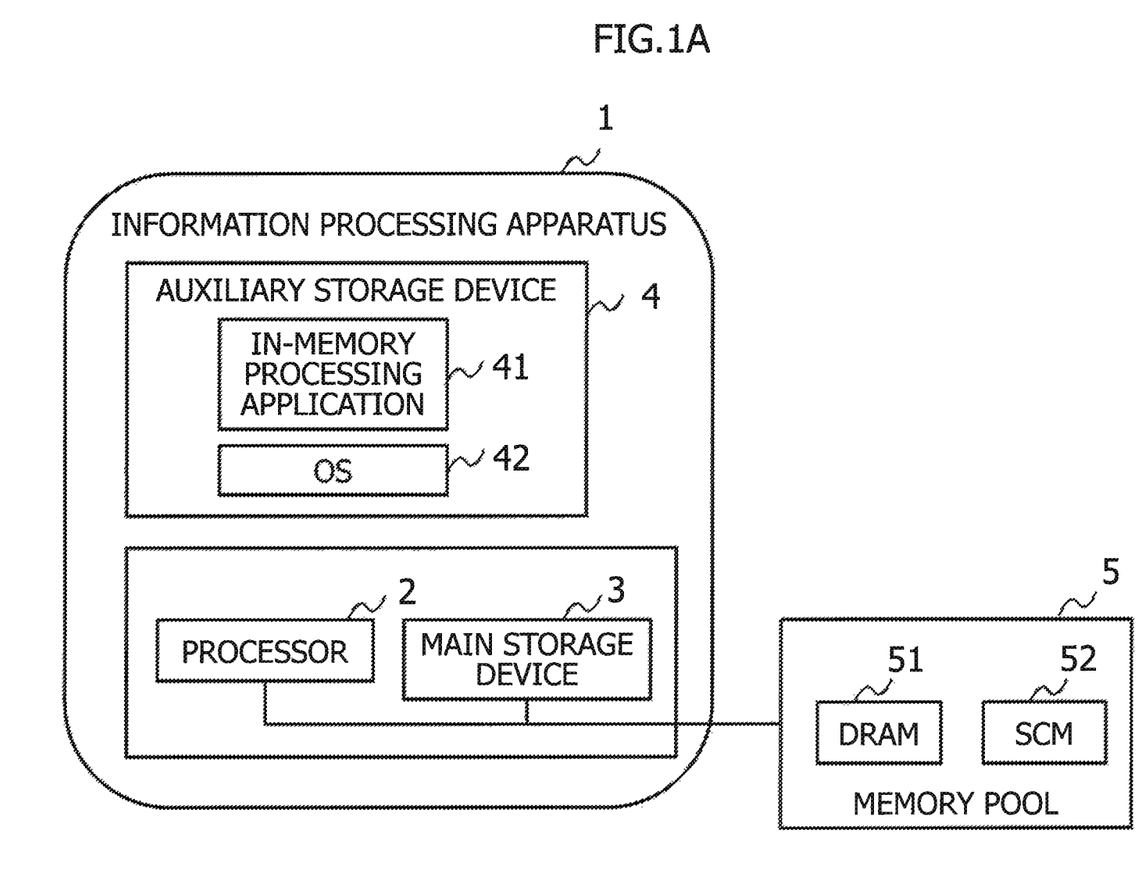
FIG. 1A is a diagram illustrating one example of a hardware configuration of an information processing apparatus.

FIG. 1A is a diagram illustrating one example of a hardware configuration of an information processing apparatus 1. The information processing apparatus 1 includes a processor 2, a main storage device 3 and an auxiliary storage device 4, the information processing apparatus 1 being connected to a memory pool 5. Note that the hardware configuration of the information processing apparatus 1 is not limited to the configuration illustrated in FIG. 1A, the components of which may be properly added, replaced and deleted.

The processor 2 loads Operating System (OS) 42 and various categories of computer programs retained on the auxiliary storage device 4 onto the main storage device 3 and runs these software components, thereby executing a variety of processes. Part of processes based on the computer programs may, however, be run by a hardware circuit. The processor 2 is exemplified by a Central Processing Unit (CPU) and a Digital Signal Processor (DSP).

The main storage device 3 provides a storage area used for the processor 2 to load the programs stored in the auxiliary storage device 4, and a working area used for the processor 2 to run the programs. The main storage device 3 is used as a buffer to retain data. The main storage device 3 is exemplified by a semiconductor memory instanced by a Read Only Memory (ROM), a Random Access Memory (RAM) and other equivalent memories.

The auxiliary storage device 4 stores the various categories of programs and the data used for the processor 2 to run the programs. The auxiliary storage device 4 is exemplified by a nonvolatile memory instanced by an Erasable Programmable ROM (EPROM) or a Hard Disk Drive (HDD) and other equivalent storages. The auxiliary storage device 4 retains, e.g., an in-memory processing application 41, the OS 42 and other multiple application programs.

The memory pool 5 contains the heterogeneous memories each having the different access speed. In FIG. 1A, the memory pool 5 contains a DRAM 51 and an SCM 52. The memory pool 5 may also contain a plurality of DRAMs 51 and a plurality of SCMs 52. The memory pool 5 is one example of a "storage device". The DRAM 51 is one example of a "first memory". The SCM 52 is one example of a "second memory".

Figure 1B:
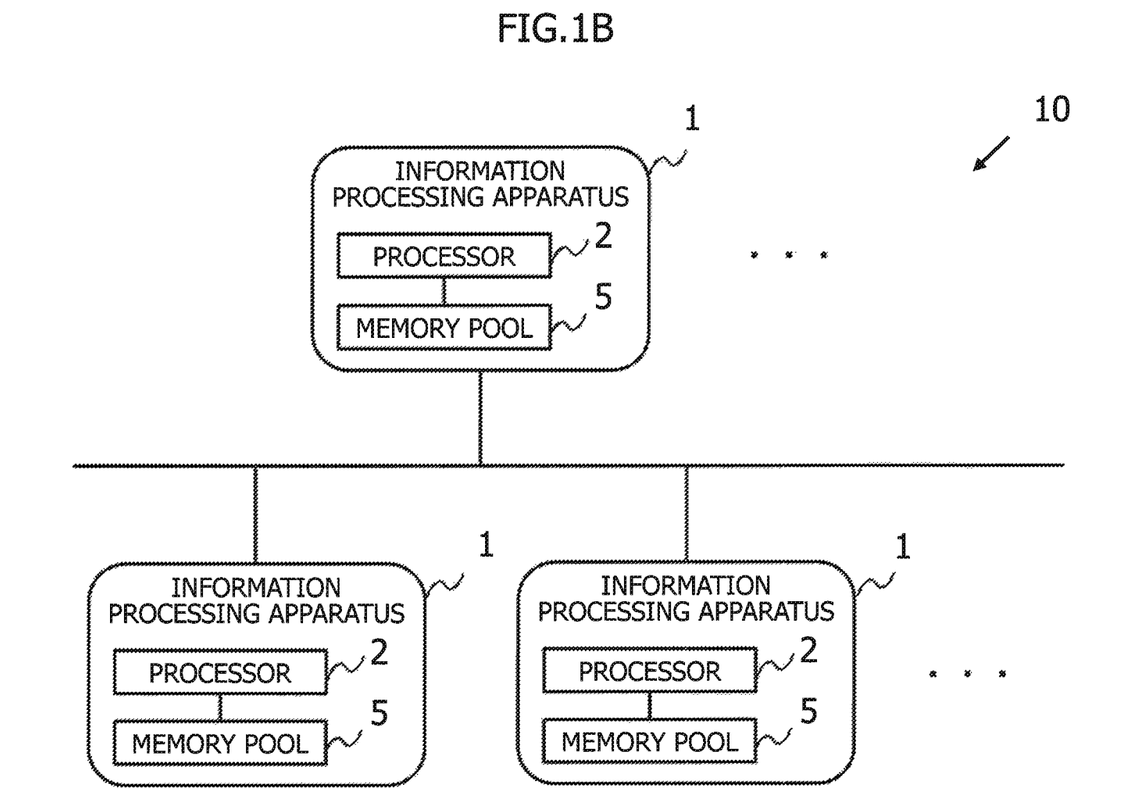
FIG. 1B is a diagram illustrating one example of architecture of an information processing system.

FIG. 1B is a diagram illustrating one example of an architecture of an information processing system 10. The information processing system 10 includes a plurality of information processing apparatuses 1. Each information processing apparatus 1 includes a processor 2 and a memory pool 5. The processor 2 and the memory pool 5 are the same as those in FIG. 1A, and hence their explanations are omitted.

The hardware configuration of the information processing apparatus 1 is not limited to the configuration illustrated in FIG. 1B, the components of which may be modified in a way of being properly added, replaced and deleted. It may be sufficient that the information processing apparatus 1 includes at least one or more of a processor 2 and a memory pool 5, and may also have the same configuration as the information processing apparatus 1 in FIG. 1A has.

Figure 2:
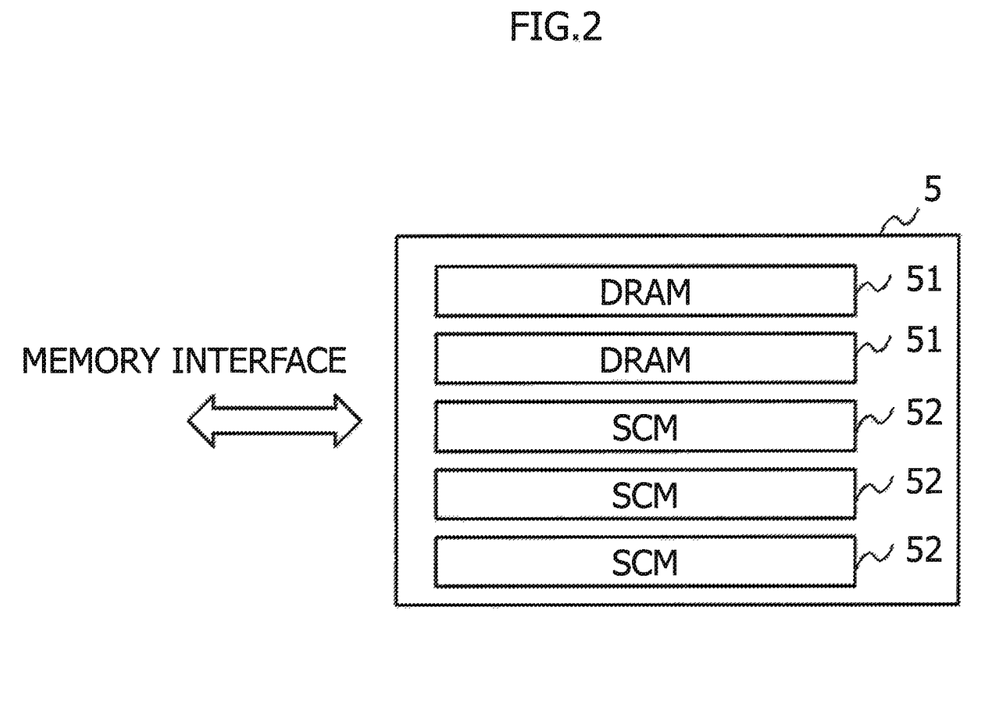
FIG. 2 is a diagram illustrating one example of a hardware configuration of a memory pool.

FIG. 2 is a diagram illustrating one example of a hardware configuration of the memory pool 5. In FIG. 2, the memory pool 5 contains two DRAMs 51 and three SCMs 52. In FIG. 2, the DRAM 51 is a module instanced by a Dual Inline Memory Module (DIMM) and other equivalent modules. The SCM 52 is exemplified by a Resistance Random Access Memory (ReRAM), a Magnetoresistive Random Access Memory (MRAM), a Parameter Random Access Memory (PRAM) and a Ferroelectric Random Access Memory (FeRAM).

A number of memory modules, i.e., the DRAMs 51, the SCMs 52 and other equivalent memories contained by the memory pool 5, is not limited to the case of FIG. 2. The number of memory modules contained by the memory pool 5 may be arbitrary on condition that the memory pool 5 contains the heterogeneous memories each having the different access speed. The memory pool 5 has a memory interface to transfer and receive the data to and from the processor 2 and the main storage device 3 of the information processing apparatus 1.

<Data Allocation to Memory Areas>

Figure 3:
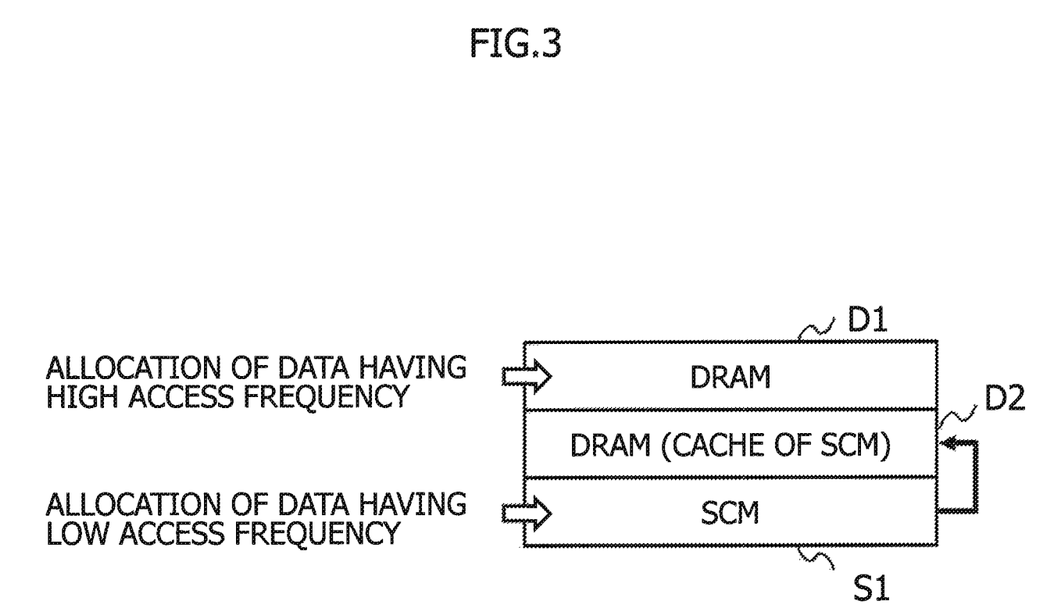
FIG. 3 is a diagram illustrating an example of how data is allocated to a memory area.
Figure 4:
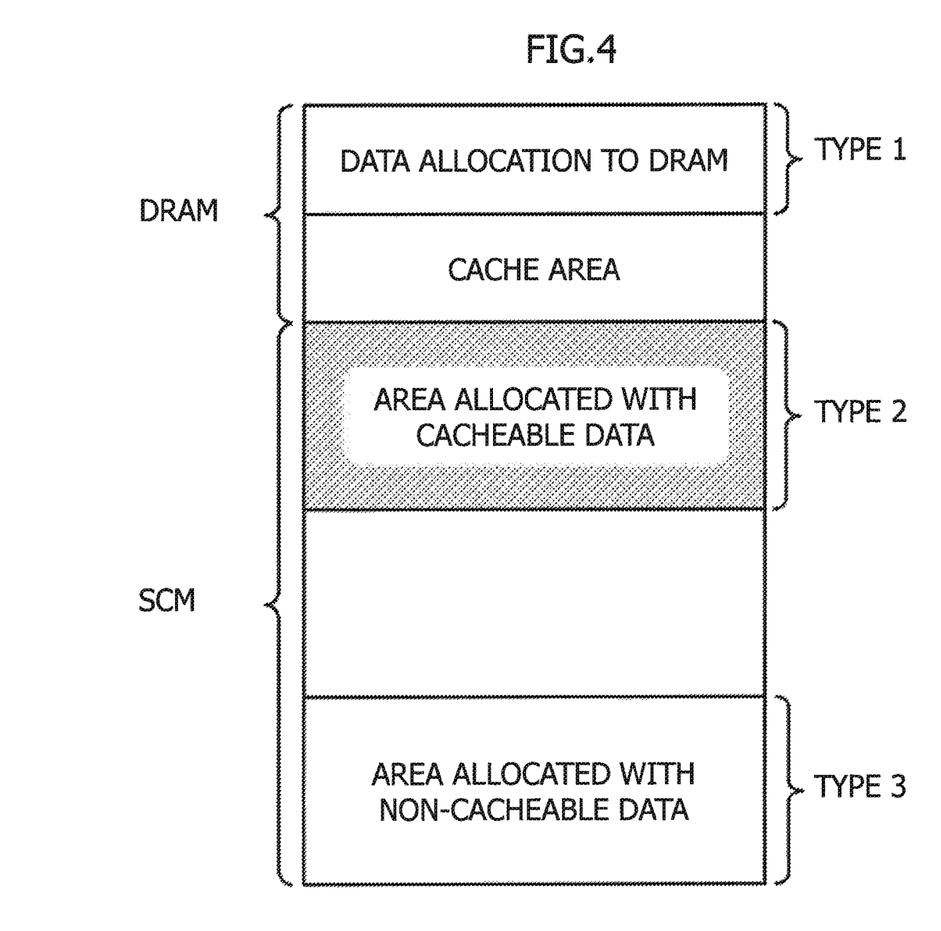
FIG. 4 is a diagram illustrating a layout example of areas of a type 1 through 3 in the memory area.

FIGS. 3 and 4 are explanatory diagrams of examples of how the data are allocated to memory areas. FIG. 3 is the diagram illustrating the example of the data allocation to the memory areas. The memory areas include the DRAM area and the SCM area. The access speed to the DRAM area is faster than the access speed to the SCM area.

The DRAM area contains areas D1 and D2. The SCM area contains an area S1. The data having an access frequency higher than a predetermined threshold value is allocated to the area D1, while the data having the access frequency equal to or lower than the predetermined threshold value is allocated to the area S1, thereby improving the access speed to the memory pool 5. The area D2 not used on the DRAM is employed as a cache for the area S1, thereby further improving the access speed to the data allocated to the area S1.

Herein, the access frequency to the data may involve using an access count and other equivalent values to the data, the access count being counted by running the application. The area D1 may also be allocated with a frequently accessed item of data instanced by meta data, indexes and other equivalent items in a database. The meta data in the database are instanced by data creation date/time, a data implementer, a data format and other equivalent data, and are used for efficiently managing and searching for the data.

FIG. 4 is the diagram illustrating a layout example of areas of a type 1 through 3 in the memory area. In FIG. 4, the memory area contains the DRAM area and the SCM area. The DRAM area contains an area of the type 1 and a cache area. The area of the type 1 in FIG. 4 corresponds to the area D1 in FIG. 3. The cache area in FIG. 4 corresponds to the area D2 in FIG. 3.

The area of the type 1 is allocated with the frequently accessed data. The area of the type 1 is one example of a "first storage area". The cache area is an area exclusive of the area of the type 1 in the DRAM area. The cache area is used as a cache of the data allocated to the SCM area.

The SCM area corresponds to the area S1 in FIG. 3, and contains an area of a type 2 and an area of a type 3. The area of the type 2 is an area that is allocated with the data to be cached in the cache area within the DRAM area. Data not receiving the frequent accesses but having a re-reference count being larger than a predetermined threshold value are allocated to the area of the type 2. The area of the type 2 is one example of a "second storage area".

The area of the type 3 is an area to be allocated with the data not cached in the cache area within the DRAM area. Data not receiving the frequent accesses and having the re-reference count being equal to or smaller than the predetermined threshold value are allocated to the area of the type 3. The area of the type 3 is one example of a "third storage area".

<Restraint of Thrashing>

Figure 5:
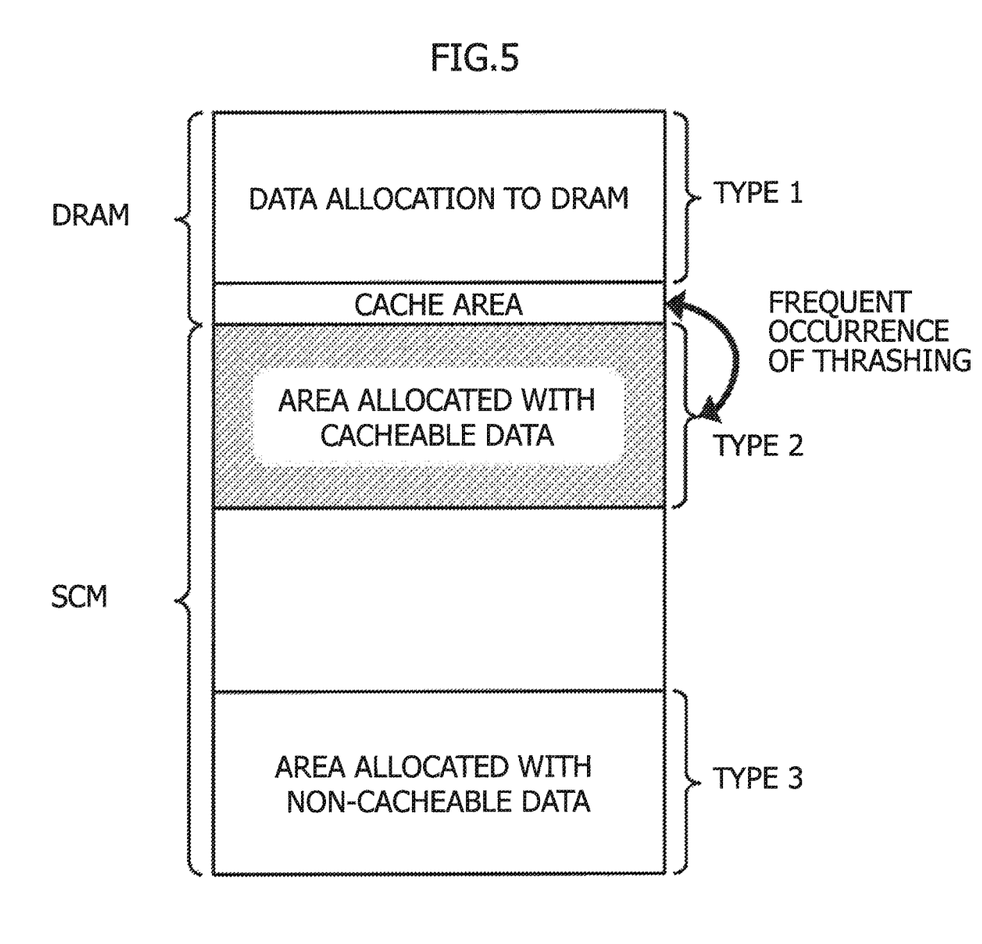
FIG. 5 is a diagram illustrating an example of how thrashing occurs due to a decrease in capacity of a cache area.
Figure 6:
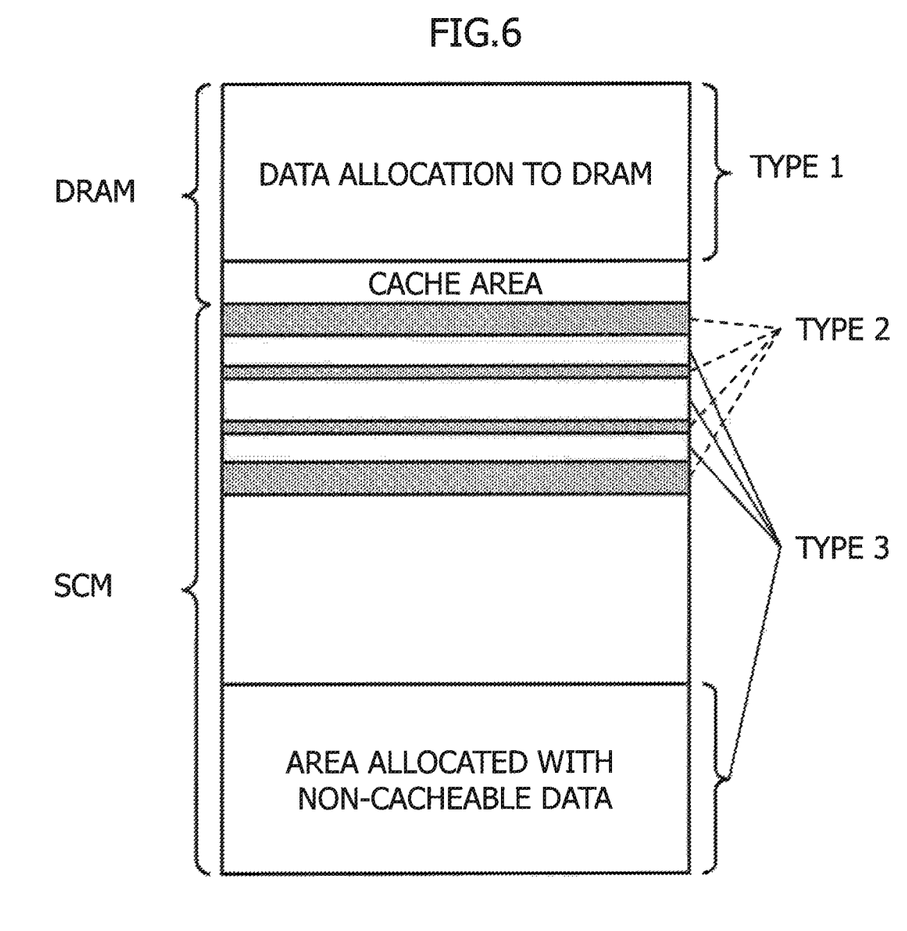
FIG. 6 is a diagram illustrating an example of changing areas of a type 2 to areas of a type 3 corresponding to a decrease in capacity of a cache area.

FIGS. 5 and 6 are explanatory diagrams of the thrashing is restrained. FIG. 5 is the diagram illustrating how the thrashing occurs due to a decrease in capacity of the cache area. In FIG. 5, the memory area contains the DRAM area and the SCM area. The SCM area is the same as the area in FIG. 4, and hence its explanation is omitted.

The DRAM area contains, similarly to FIG. 4, the area of the type 1 and the cache area. However, the capacity of the cache area decreases as compared with the case in FIG. 4 due to a rise in data quantity to be allocated to the area of the type 1. A balance between the caching target data quantity allocated to the area of the type 2 and the capacity of the cache area on the DRAM collapses due to the decrease in capacity of the cache area.

Therefore, a page is frequently replaced in the cache area, resulting in facilitating occurrence of the thrashing causing a decline of a processing performance. The capacity of the area of the type 2 is changed to restrain the thrashing.

FIG. 6 is a diagram illustrating an example of changing areas of the type 2 to areas of the type 3 corresponding to the decrease in capacity of the cache area. In FIG. 6, the memory area contains the DRAM area and the SCM area. The DRAM area is the same as in FIG. 5, and hence its explanation is omitted. The SCM area contains the areas of the type 2 and the areas of the type 3. In the information processing apparatus 1 according to the embodiment, as illustrated in FIG. 6, part of the areas of the type 2 are changed to the areas of the type 3 corresponding to the decrease incapacity of the cache area.

<Area Management Information>

FIGS. 7A through 7D are explanatory diagrams of area management information of the cache area, the DRAM area and the SCM area. The area management information is deployed on the memory to be accessed from the processor 2. The area management information may also be deployed on, e.g., the DRAM area or the SCM area. The area management information is referred to or updated when conducting a memory allocation and a memory release. Note that data structures of the area management information illustrated in FIGS. 7A through 7D are each one example, and the embodiment is not limited to these data structures.

Figure 7A:
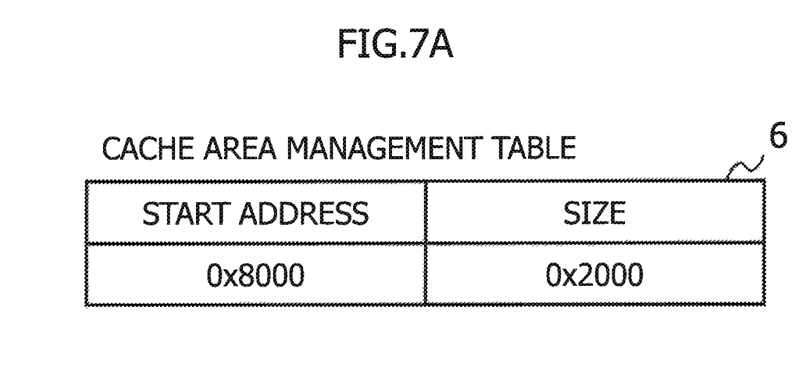
FIG. 7A is a diagram illustrating one example of a data structure of a cache area management table.

FIG. 7A is the diagram illustrating one example of the data structure of a cache area management table 6. The cache area management table 6 manages items of information about the cache area. The cache area management table 6 stores, e.g., a "start address" and a "size".

The "start address" indicates a start position of the cache area in the memory area. The "size" indicates a size of the cache area in the memory area. To be specific, in the example of FIG. 7A, the cache area is an area starting from an address "0×8000" and having a size of (0×2000) bytes.

Figure 7B:
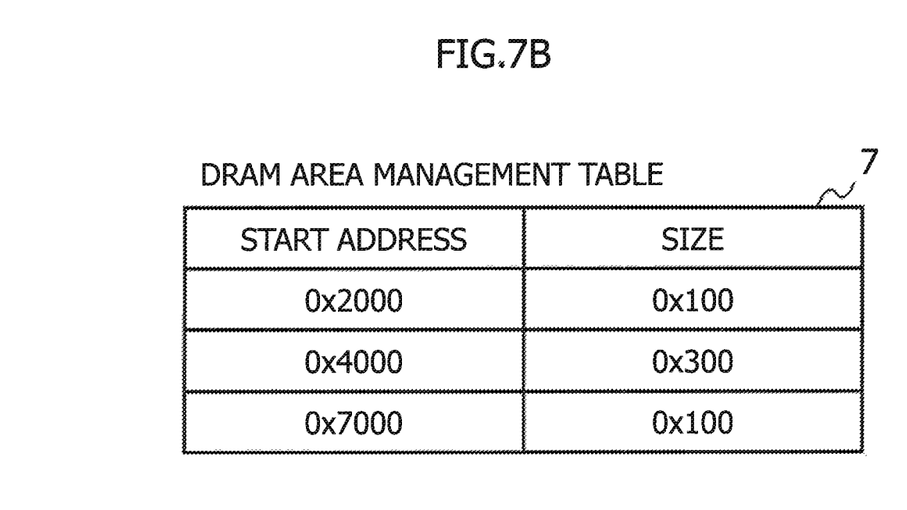
FIG. 7B is a diagram illustrating one example of a data structure of a DRAM area management table.

FIG. 7B is the diagram illustrating one example of a data structure of a DRAM area management table 7. The DRAM area management table 7 manages information about the area of the type 1 per plurality of areas (which will hereinafter be also termed pages).

The DRAM area management table 7 stores the "start address", the "size" and other equivalent items on a page-by-page basis. The "start address" indicates a start position of the page in the memory area. The "size" indicates a size of the page in the memory area.

Concretely, in the example of FIG. 7B, the DRAM area contains, as the areas of the type 1, an area starting from an address "0×2000" and having a size of (0×100) bytes, an area starting from an address "0×4000" and having a size of (0×300) bytes, and an area starting from an address "0×7000" and having a size of (0×100) bytes.

Figure 7C:
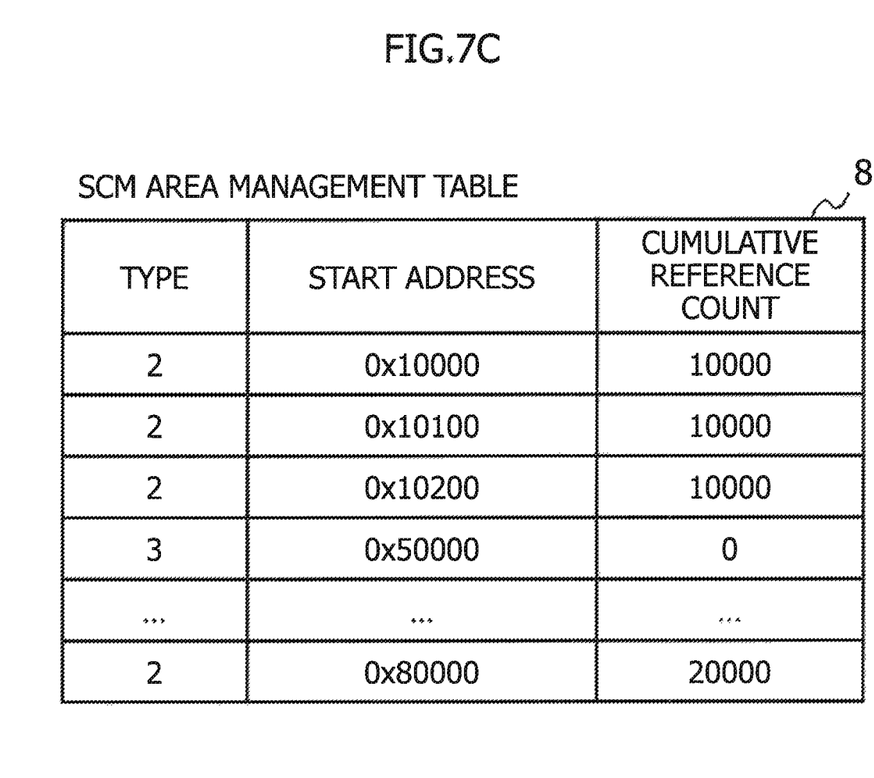
FIG. 7C is a diagram illustrating one example of a data structure of an SCM area management table.

FIG. 7C is the diagram illustrating one example of a data structure of an SCM area management table 8. The SCM area management table 8 manages information about the SCM area on the page-by-page basis. The SCM area, though being hereinafter described on the assumption of being managed on the page-by-page basis of a fixed length, may also be managed per arbitrary unit area.

The SCM area management table 8 stores a "type", a "start address" and a "cumulative reference count" on the page-by-page basis. The "type" is a value indicating whether the page is the area of the type 2 or the area of the type 3. The "start address" indicates a start position of the page in the memory area. The "cumulative reference count" indicates a cumulative value of how many times the page is referred to so far.

Concretely, in the example of FIG. 7C, the SCM area is managed per page having a size of (0×100) bytes. The SCM area contains the areas of the type 2 starting from an address "0×10000" and being allocated with data of a cumulative reference count "10000", and the areas of the type 3 starting from an address "0×50000" and being allocated with data of a cumulative reference count "0".

Figure 7D:
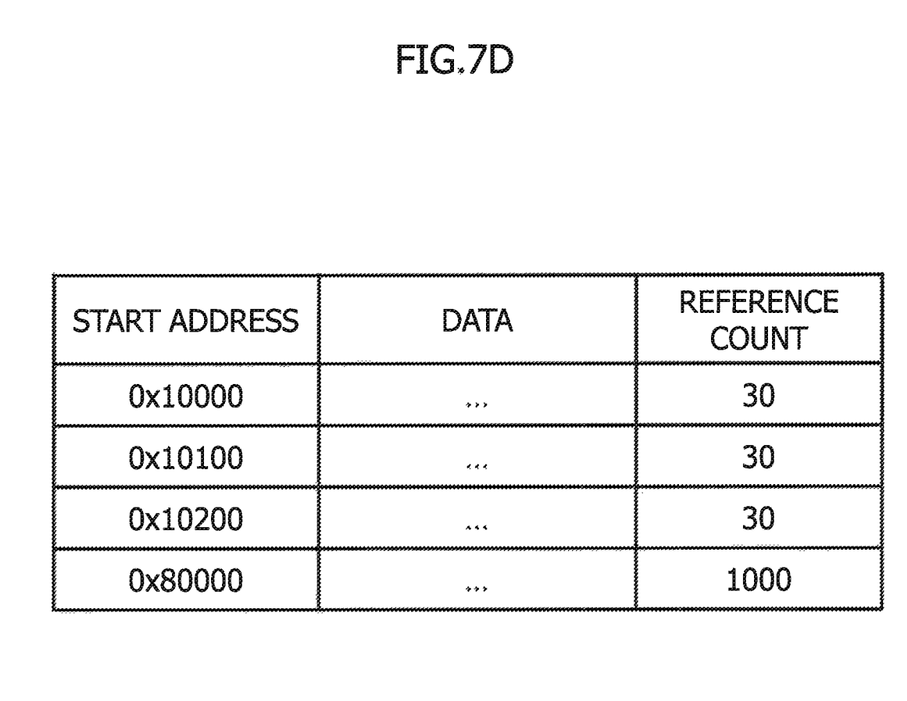
FIG. 7D is a diagram illustrating an example of entries of a cache configured on a DRAM.

FIG. 7D is the diagram illustrating an example of cache entries configured on the DRAM. The cache area is configured by the plurality of entries on the DRAM. Each entry corresponds to each page in the area of the type 2, and stores a "start address", "data" and a "reference count". Herein, the area of the type 2 is managed on the page-by-page basis of the fixed length and may, however, be managed on a unit of an arbitrary length.

The "start address" indicates a start address, in the SCM, of the page that is cached in the cache area. The "data" indicates data of the page to be cached. The "reference count" is a value of how many times the data of the page is referred to during a period of being cached in the cache area.

Specifically, in FIG. 7D, the cache area contains entries having start addresses instanced by "0×10000" and pages with the reference count being "30", an entry having a start address "0×80000" and a page with the reference count being "1000", and other equivalent entries.

<Processing Flow>

Figure 8:
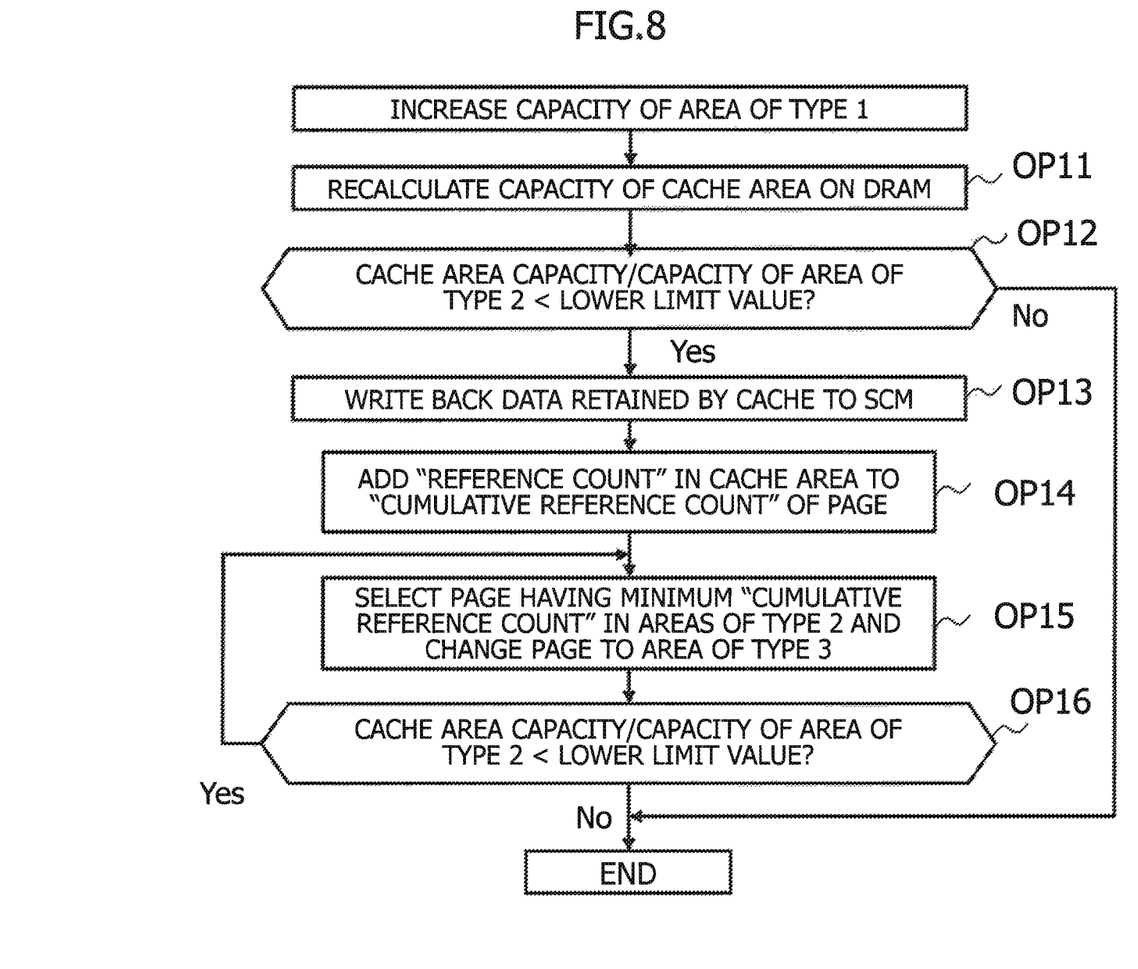
FIG. 8 is one example of a flowchart of a process of changing the areas of the type 2 to the areas of the type 3.
Figure 9:
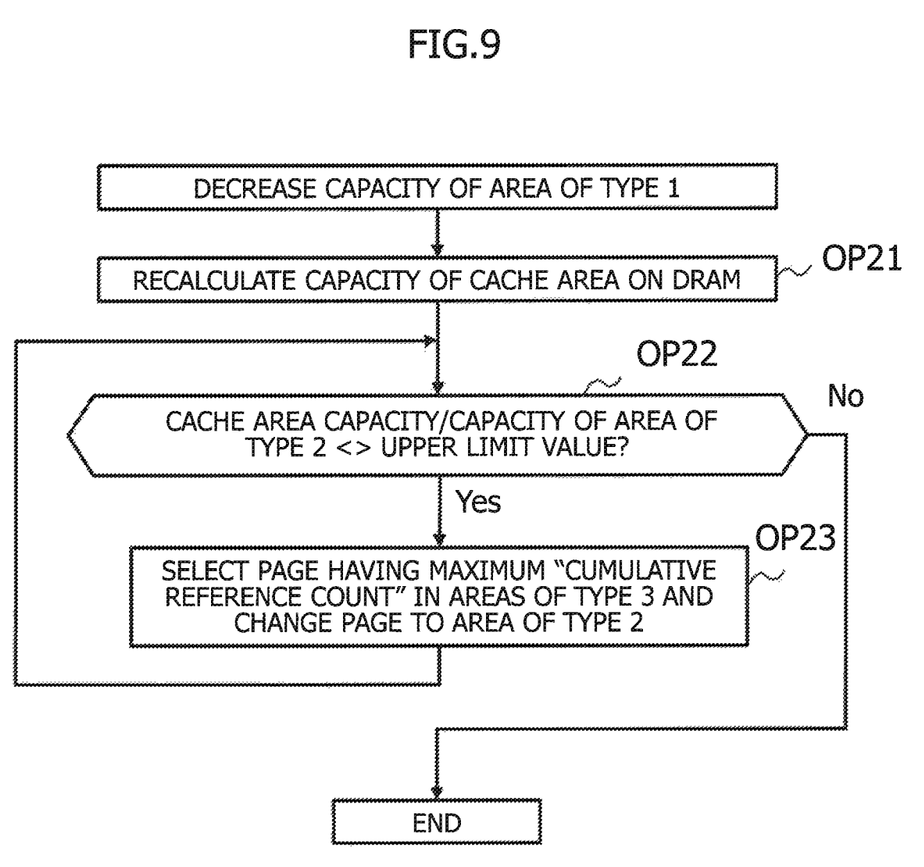
FIG. 9 is one example of a flowchart of a process of changing the areas of the type 3 to the areas of the type 2.

FIGS. 8 and 9 are explanatory flowcharts each illustrating a processing flow of changing capacities of the areas of the type 2 and 3, corresponding to a change of the capacity of the area of the type 1. The capacity of the areas of the type 1 increases, while the capacity of the cache area decreases, in which case part of the areas of the type 2 are changed to the areas of the type 3. The occurrence of the thrashing is thereby restrained.

On the other hand, a capacity of the area of the type 1 decreases, while the capacity of the cache area increases, in which case part of the areas of the type 3 are changed to the areas of the type 2. With this contrivance, the data allocated to the areas of the type 2 are increased, and the data cached in the cache area on the DRAM and accessed are also increased, thereby improving the access speed.

FIG. 8 is one example of the flowchart of the process of changing the areas of the type 2 to the areas of the type 3. FIG. 8 depicts an example of changing part of the areas of the type 2 to the areas of the type 3 on the page-by-page basis so that a ratio of the capacity of the cache area to the capacity of the areas of the type 2 becomes equal to or larger than a predetermined lower limit value.

A start of the process of changing the areas of the type 2 to the areas of the type 3 is triggered by the increase in capacity of the area of the type 1. In OP11, the processor 2 recalculates the capacity of the cache area on the DRAM. The capacity of the cache area is the capacity of the areas excluding the area of the type 1 on the DRAM. The capacity of the cache area may also be obtained by subtracting the capacity of the area of the type 1 from the capacity of the DRAM area. Next, the processing advances to OP12.

In OP 12, the processor 2 determines whether or not the ratio of the capacity of the cache area to the capacity of the areas of the type 2 is smaller than the predetermined lower limit value. When smaller than the predetermined lower limit value (OP12: Yes), the processing advances to OP13. Whereas when equal to or larger than the predetermined lower limit value (OP12: No), the processing is finished.

In OP13, the processor 2 writes back the data retained in the cache area to the SCM area before changing the type of the areas. Subsequently, the processing advances to OP14. In OP14, the processor 2 adds the "reference count" of each page of the data written back to the SCM area to the "cumulative reference count" of the page concerned. The "reference count" is a reference count to be stored in each entry of the cache area illustrated in FIG. 7D. The "cumulative reference count" is a cumulative reference count in the SCM area management table 8 illustrated in FIG. 7C. Next, the processing advances to OP15.

In OP15, the processor 2 selects a page having the minimum "cumulative reference count" in the areas of the type 2 and changes the type of this page to the type 3. The type of each page is changed by changing the "type" field from "2" to "3" in the SCM area management table 8. The process in OP15 is one example of a process of "decreasing a capacity of an area of the type 2 but increasing a capacity of an area of the type 3, corresponding to a capacity of a cache area when a capacity of an area of the type 1 increases and when the capacity of the cache area decreases". Subsequently, the processing advances to OP16.

In OP16, the processor 2 determines, similarly to OP12, whether the ratio of the capacity of the cache area to the capacity of the areas of the type 2 is smaller than the predetermined lower limit value. When smaller than the predetermined lower limit value (OP16: Yes), the processing loops back to OP15. Whereas when equal to or larger than the predetermined lower limit value (OP16: No), the processing is finished.

FIG. 9 is one example of the flowchart of the process of changing the areas of the type 3 to the areas of the type 2. FIG. 9 illustrates an example of changing part of the areas of the type 3 to the areas of the type 2 on the page-by-page basis so that the ratio of the capacity of the cache area to the capacity of the areas of the type 2 becomes equal to or smaller than a predetermined upper limit value.

A start of the process of changing the areas of the type 3 to the areas of the type 2 is triggered by decreasing, e.g., the capacity of the area of the type 1. The process in OP21 is the same as the process in OP11 of FIG. 8, and hence its explanation is omitted.

In OP 22, the processor 2 determines whether the ratio of the capacity of the cache area to the capacity of the areas of the type 2 is larger than the predetermined upper limit value. When larger than the predetermined upper limit value (OP22: Yes), the processing advances to OP23. Whereas when equal to or smaller than the predetermined upper limit value (OP22: No), the processing is finished.

In OP23, the processor 2 selects a page having the maximum "cumulative reference count" in the areas of the type 3 and changes the type of this page to the type 2. The area of each page is changed by changing the "type" field from "3" to "2" in the SCM area management table 8. Subsequently, the processing loops back to OP22.

<Modified Example>

The process of changing the areas of the type 2 to the areas of the type 3 is not limited to the method illustrated in FIG. 8. It may be sufficient that part of the areas of the type 2 are changed to the areas of the type 3 so that the ratio of the capacity of the cache area to the capacity of the areas of the type 2 falls within a range of restraining the occurrence of the thrashing.

The process of changing the areas of the type 3 to the areas of the type 2 is not limited to the method illustrated in FIG. 9. It may be sufficient that the type of the areas is changed so that the ratio of the capacity of the cache area to the capacity of the areas of the type 2 falls within the range of restraining the occurrence of the thrashing. It may also be sufficient that part of the areas of the type 3 are changed to the areas of the type 2 so as to increase the capacity of the areas of the type 2 of the data to be cached in the cache area on the DRAM and to improve the access speed.

For example, according to the embodiment, the page targeted on changing the type is selected based on the cumulative reference count of each page. The page targeted on changing the area may also be, however, selected based on the reference count and other equivalent values on the cache area without being limited to the cumulative reference count.

The information processing apparatus 1 included in the information processing system 10 in FIG. 1B may simply have any one of the set of plural processors 2 and the set of memory pools 5. When the plurality of memory pools 5 is provided for one single processor 2, the information processing apparatus 1 may simply manage the memory area by controlling the area management information per memory pool 5. On the other hand, when the plurality of processors 2 is provided for one single memory pool 5, the information processing apparatus 1 may simply manage the memory area by one single processor 2 controlling the area management information of the memory pool 5.

<Operational Effect of Embodiment>

The processor 2, when accessing the memory pool 5 containing the heterogeneous memories each having the different access speed, allocates the data having the access frequency being higher than the predetermined threshold value to the area of the type 1 on the DRAM, and allocates the data having the access frequency being equal to or lower than the predetermined threshold value to the area of the type 2 on the SCM. The unused area allocated with no data on the DRAM is used as the cache of the area of the type 2.

When the data allocated to the area of the type 1 increases, the capacity of the cache area used as the cache of the area of the type 2 decreases. The processor 2 changes the areas of the type 2 to the areas of the type 3, corresponding to the capacity of the cache area. The areas of the type 3 are not set as the target for the cache, and hence the quantity of the data cached in the cache area decreases. The processor 2 is thereby enabled to avoid the decreases in access speed by restraining the occurrence of the thrashing.

When the data allocated to the area of the type 1 reduces, the capacity of the cache area increases, which is used as the cache of the areas of the type 2. The processor 2 changes the areas of the type 3 to the areas of the type 2, corresponding to the capacity of the cache area. The quantity of the data cached in the cache area increases, and therefore the processor 2 can improve the access speed to the data allocated onto the SCM.

The processor 2 changes the areas of the type 2 to the areas of the type 3 from the page having the lower access frequency. On the other hand, the processor 2 changes the areas of the type 3 to the areas of the type 2 from the page having the higher access frequency. This contrivance enables the data to be allocated corresponding to the access frequency, and also enables avoidance of the decrease in access speed.

According to the information processing apparatus, the information processing control method, the storage device control computer program, and the information processing system, it is feasible to avoid the decrease in access speed to the storage device containing the heterogeneous memories each having the different access speed.

<Non-Transitory Recording Medium>

A program making a computer, other machines and apparatuses (which will hereinafter be referred to as the computer and other equivalent apparatuses) attain any one of the functions, can be recorded on a non-transitory recording medium readable by the computer and other equivalent apparatuses. The computer and other equivalent apparatuses are made to read and run the program on this non-transitory recording medium, whereby the function thereof can be provided.

Herein, the non-transitory recording medium readable by the computer and other equivalent apparatuses connotes a non-transitory recording medium capable of accumulating information instanced by data, programs and other equivalent information electrically, magnetically, optically, mechanically or by chemical action, which can be read from the computer and other equivalent apparatuses. Among these non-transitory recording mediums, the mediums removable from the computer and other equivalent apparatuses are exemplified by a flexible disc, a magneto-optic disc, a CD-ROM, a CD-R/W, a DVD, a Blu-ray disc, a DAT, an 8 mm tape, and a memory card like a flash memory. A hard disc, a ROM and other equivalent recording mediums are given as the non-transitory recording mediums fixed within the computer and other equivalent apparatuses. Still further, a solid state drive (SSD) is also available as the non-transitory recording medium removable from the computer and other equivalent apparatuses and also as the non-transitory recording medium fixed within the computer and other equivalent apparatuses.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
   a storage device configured to have a first memory including a first storage area and a second memory including a second storage area and a third storage area, the second memory being slower in speed than the first memory and the first memory further including a cache area which is other than the first storage area and is configured to store cache of data stored in the second storage area; and
   a processor configured to calculate a reference count of data stored in the cache area and change a storage destination, to the third storage area, of data in the second storage area which corresponds to data the reference count of which is equal to or smaller than a predetermined threshold value, when a capacity of the first storage area increases and a capacity of the cache area decreases by a first amount of capacity, to increase a capacity of the third storage area by a second amount of capacity determined based on the first amount of capacity and decrease a capacity of the second storage area by a third amount of capacity determined based on the first amount of capacity.

2. The information processing apparatus according to claim 1, wherein the processor decreases the capacity of the third storage area while increasing the capacity of the second storage area corresponding to the capacity of the cache area upon a decrease of the capacity of the first storage area and an increase of the capacity of the cache area.

3. The information processing apparatus according to claim 2, wherein the processor changes the storage destination, to the second storage area, of data selected from data stored in the third storage area corresponding to the access frequency to the data stored in the third storage area upon the decrease of the capacity of the first storage area and the increase of the capacity of the cache area.

4. A storage device control method comprising:
   disposing, by a processor of an information processing apparatus including a storage device having a first memory and a second memory being slower in speed than the first memory, a first storage area and a cache area other than the first storage area on the first memory;
   disposing, by the processor, a second storage area and a third storage area on the second memory; and
   calculating, by the processor, a reference count of data stored in the cache area and changing a storage destination, to the third storage area, of data in the second storage area which corresponds to data the reference count of which is equal to or smaller than a predetermined threshold value, when a capacity of the first storage area increases and a capacity of the cache area decreases by a first amount of capacity, to increase a capacity of the third storage area by a second amount of capacity determined based on the first amount of capacity and decreasing a capacity of the second storage area by a third amount of capacity determined based on the first amount of capacity, the cache area being configured to store cache of data stored in the second storage area.

5. A non-transitory computer-readable recording medium having stored therein a program for causing a processor of an information processing apparatus including a storage device having a first memory and a second memory being slower in speed than the first memory to execute a process comprising:

disposing a first storage area and a cache area other than the first storage area on the first memory;

disposing, a second storage area and a third storage area on the second memory; and calculating a reference count of data stored in the cache area and changing a storage destination, to the third storage area, of data in the second storage area which corresponds to data the reference count of which is equal to or smaller than a predetermined threshold value, when a capacity of the first storage area increases and a capacity of the cache area decreases by a first amount of capacity, to increase a capacity of the third storage area by a second amount of capacity determined based on the first amount of capacity and decreasing a capacity of the second storage area by a third amount of capacity determined based on the first amount of capacity, the cache area being configured to store cache of data stored in the second storage area.

6. An information processing system comprising:

a plurality of an information processing apparatus including at least one or more of:

a storage device configured to have a first memory including a first storage area and a second memory including a second storage area and a third storage area, the second memory being slower in speed than the first memory and the first memory further including a cache area which is other than the first storage area and is configured to store cache of data stored in the second storage area; and a processor configured to calculate a reference count of data stored in the cache area and change a storage destination, to the third storage area, of data in the second storage area which corresponds to data the reference count of which is equal to or smaller than a predetermined threshold value, when a capacity of the first storage area increases and a capacity of the cache area decreases by a first amount of capacity, to increase a capacity of the third storage area by a second amount of capacity determined based on the first amount of capacity and decrease a capacity of the second storage area by a third amount of capacity determined based on the first amount of capacity.

7. The information processing apparatus according to claim 1, wherein the first storage area is configured to store data having an access frequency higher than a first predetermined threshold value, the second storage area is configured to store data having a re-reference count being larger than a second predetermined threshold value, and the third storage area is configured to store data having a re-reference count being equal to or smaller than the second predetermined threshold value.

8. The storage device control method according to claim 4, wherein the first storage area is configured to store data having an access frequency higher than a first predetermined threshold value, the second storage area is configured to store data having a re-reference count being larger than a second predetermined threshold value, and the third storage area is configured to store data having a re-reference count being equal to or smaller than the second predetermined threshold value.

9. The non-transitory computer-readable recording medium according to claim 5, wherein the first storage area is configured to store data having an access frequency higher than a first predetermined threshold value, the second storage area is configured to store data having a re-reference count being larger than a second predetermined threshold value, and the third storage area is configured to store data having a re-reference count being equal to or smaller than the second predetermined threshold value.

10. The information processing system according to claim 6, wherein the first storage area is configured to store data having an access frequency higher than a first predetermined threshold value, the second storage area is configured to store data having a re-reference count being larger than a second predetermined threshold value, and the third storage area is configured to store data having a re-reference count being equal to or smaller than the second predetermined threshold value.

* * * * *